No. 801,702. PATENTED OCT. 10, 1905.
S. S. WYER.
DREDGING CUTTER.
APPLICATION FILED MAR. 8, 1904.

WITNESSES:
G. H. Wheaton.
C. S. Wheaton

INVENTOR.
Samuel S. Wyer
BY Samuel S. Wyer
ATTORNEY.

UNITED STATES PATENT OFFICE.

SAMUEL S. WYER, OF COLUMBUS, OHIO.

DREDGING-CUTTER.

No. 801,702.  Specification of Letters Patent.  Patented Oct. 10, 1905.

Application filed March 8, 1904. Serial No. 197,186.

*To all whom it may concern:*

Be it known that I, SAMUEL S. WYER, a citizen of the United States, residing in Columbus, in the county of Franklin and State of Ohio, have invented a new and useful Form of Dredging-Cutter, of which the following is a specification.

The object of my invention is to provide a strong and rigid rotating cutter that will do the dredging, excavating, or its part of the loading of the material, as the case may be, and dump its entire contents, so that by suitable mechanism a conveyer or elevator of lighter construction can then pick up the material and carry it to the place where the material is to be deposited.

Figure 3:
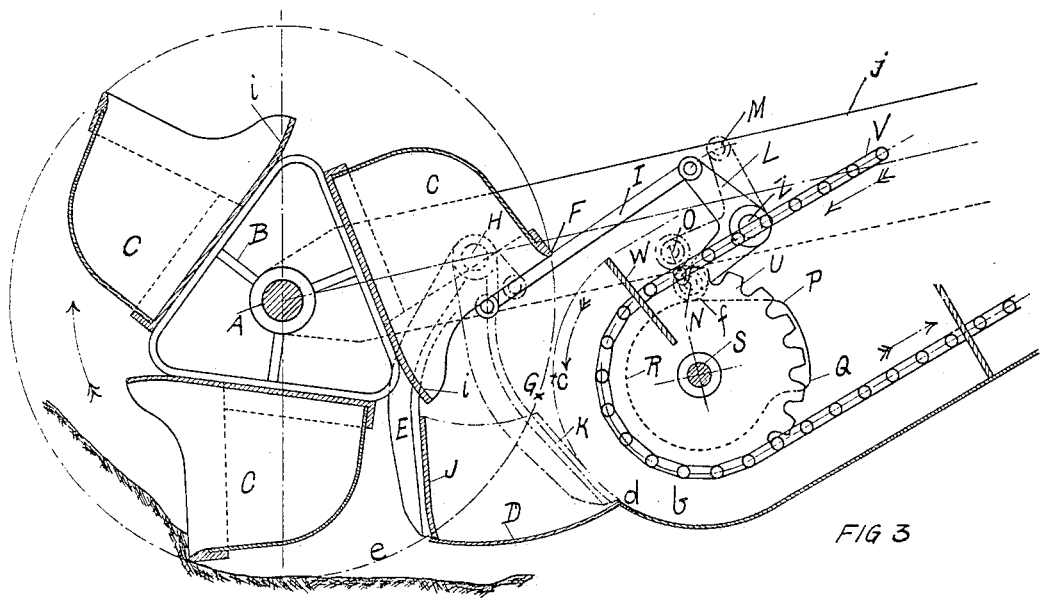

Whenever the term "dredging-cutter" is used in this patent-claim, it is understood to mean a bucket, as denoted by C on Figure 3, and one that may be used either for dredging, excavating, or loading, or performing these respective functions simultaneously. I accomplish this by means of the arrangement shown on the accompanying drawings, in which—

Figure 1:
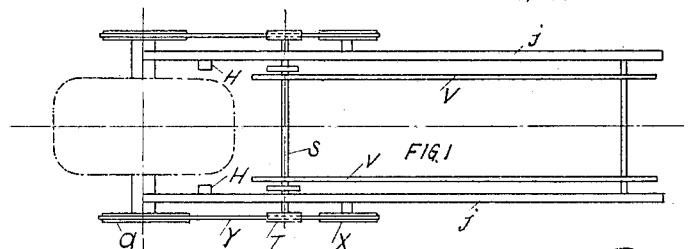
Figure 2:
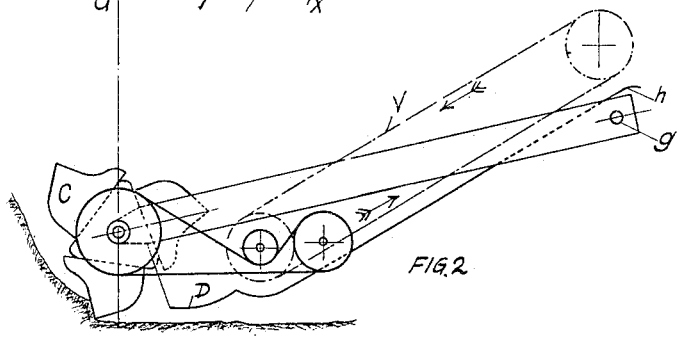

Fig. 1 is a plan view, Fig. 2 is an elevation, and Fig. 3 is a section, which shows the operation of all the constituent parts, the object of Figs. 1 and 2 merely being to show the arrangement as a whole.

A is the main shaft, upon which is secured the spider B, the object of B being to support and drive the dredging-buckets C.

D is a receiving-pan into which the buckets C empty their contents.

E is a lever for moving the pusher J, (one lever being placed on each side of the cutters.)

F and G are arbitrary points on the outermost path of the cutting edge of the buckets.

H is the shaft upon which the lever E swings.

I is a link for connecting E with bell-crank L.

J is the pusher-plate, which moves the material that has been dumped on D over into $b$, so that the elevator or conveyer may remove said material.

K shows the position of pusher J when it is at the extreme point of its path of travel.

L is a bell-crank.

M and O show the position of the bell-crank in its extreme position of travel.

N is a roller in the above bell-crank.

P Q R represent a cam which is secured to shaft S, Q and R being concentric portions of this cam.

S is a sprocket-shaft which is driven by means of the chain V and sprocket-wheel U.

T is a sprocket-wheel fastened to S and which drives the chain V, the latter being used to drive the shaft A.

W is a scraper on the chain V, the function of W being to remove the material from $b$ and take it to the place where it is to be deposited.

X is an idler for keeping the chain Y in proper tension.

Z is the shaft on which the bell-crank L swings.

$a$ is the sprocket which drives the shaft A.

$b$ is the space into which the material is pushed and then taken away by means of the scraper W.

$c$ and $d$ are arbitrary points on the outer path of the scraper W as it goes around the sprocket V.

$e$ is the path of the outermost point of the buckets C.

$f$ is the point of contact between the roller N and the cam P Q R.

$g$ is a center or point from which the framework $j$, that contains the mechanism of the cutter, is suspended. The center $g$ may be on the usual form of dredge-boat or on any form carriage that would be adapted to the local conditions in which the dredging, excavating, or loading cutter was working. The material from the conveyer is discharged at the point $h$.

$i$ is a curved discharge-lip on the bottom of the bucket, whose function it is to give the material as it slides down the bottom of the bucket a horizontal component, so as to throw the said material over nearer to $b$.

The operation is as follows: The framework that supports the mechanism is so adjusted as to bring the revolving cutters C in contact with the material that is to be handled. As the cutters revolve they are filled with the material and then dump their contents into the pan D. On the drawings the point F shows the position of the cutter when it has just emptied its contents. The shaft S and cam P Q R make one revolution for each cutter on the shaft A—*i. e.*, in the arrangement shown S makes three revolutions to one of A. Now while point F moves to G the scraper W moves to $c$. The cam moves the roller and bell-crank from N to O, and by means of the connecting-link I E and J are moved to the position K. Then by means of the concentric lobe P Q of the cam the pusher J is held at the position K until the scraper W has moved around past the point $d$ and the position of the cutter also moving simultaneously from G down along the path $e$. Then the cam allows the pusher to slide back to the position shown by J. The lever E may be assisted in its return movement by a spring, counterweight, or cam. The pan D is then ready to receive the contents of another bucket or cutter and the above cycle repeated.

What I claim as new, and desire to secure by Letters Patent, is the following:

1. The combination with a dredging-cutter, of a receiving-pan, as D, for receiving the material from a dredging-cutter.

2. The combination of a pusher with a dredging cutter and conveyer or elevator, in which the said pusher removes the material deposited by the said dredging-cutter and so places said material that the said conveyer or elevator can pick up said material and carry said material away; this pusher to work in synchronism with the rotation of and number of buckets on said dredging-cutter; that is, the pusher will make one complete cycle for every bucket on the dredging-cutter.

3. Broadly, the combination of a dredging cutter, elevator or conveyer with a pusher that remains stationary or nearly so at the following two points in its cycle; first, said pusher to remain stationary or nearly so while said dredging-cutter is discharging, then after said pusher has delivered the material received from the dredging-cutter to the elevator or conveyer, the said pusher will again remain stationary or nearly so and thus allow the elevator or conveyer to remove the material and also permit the cutter to pass down behind it; then the pusher will return to its starting position and complete its cycle, substantially as described.

4. The combination of a dredging cutter, elevator or conveyer and a cam or cams with concentric lobes for giving the pusher the intermittent motion specified.

5. The combination of a dredging cutter and elevator, with a curved bottom or discharge-lip to the bottom of a dredging-cutter for giving the motion of the material a horizontal component toward the elevator when said material is being discharged from the said dredging-cutter.

In testimony whereof I have signed my name to this specification in the presence of two subscribing witnesses.

SAMUEL S. WYER.

Witnesses:
MAUDE F. WHEATON,
EVA T. WHEATON.